United States Patent [19]

Fukuda et al.

[11] Patent Number: 4,539,394
[45] Date of Patent: Sep. 3, 1985

[54] LACTONE-MODIFIED DIOL

[75] Inventors: Yutaka Fukuda; Kenichi Sasaki, both of Himeji, Japan

[73] Assignee: Daicel Chemical Industries, Ltd., Sakai, Japan

[21] Appl. No.: 630,501

[22] Filed: Jul. 11, 1984

[30] Foreign Application Priority Data

Jul. 25, 1983 [JP] Japan .................. 58-135381

[51] Int. Cl.³ ............... C08G 63/08; C08G 65/18; C08G 65/20
[52] U.S. Cl. .................. 528/354; 560/185; 528/76
[58] Field of Search .......... 528/354; 560/185

[56] References Cited

U.S. PATENT DOCUMENTS 3,689,531 9/1972 Critchfield et al. .......... 260/484 A
4,078,148 3/1978 Volkommer et al. .......... 560/185
4,291,155 9/1981 Brochet .......... 528/354 X Primary Examiner—Earl A. Nielsen
Attorney, Agent, or Firm—Flynn, Thiel, Boutell & Tanis

[57] ABSTRACT

A novel lactone-modified diol useful as a soft segment component which provides a thermoplastic elastomer showing excellent performances in elastic recovery and low-temperature properties is provided. This lactone-modified diol is represented by the general formula:

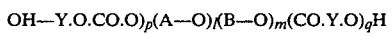

wherein Y is a bivalent residue derived by removing the ester bond from a 6- to 8-carbon saturated aliphatic lactone ring, p and q are positive numbers determined from the amount of a saturated aliphatic lactone to be reacted and $p+q \geq 1$, A represents

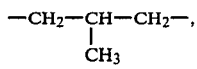

B represents $-CH_2-CH_2-CH_2-CH_2-$, and l and m are positive numbers satisfying the relationships: $l+m=$ about 6 to 140 and $l/m=10/90$ to 100/0 (molar ratio), and is obtained by reacting 1 mol of a polyalkylene ether diol of the general formula:

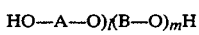

with at least one mol of a 6- to 8-carbon saturated aliphatic lactone.

8 Claims, No Drawings

LACTONE-MODIFIED DIOL

BACKGROUND OF THE INVENTION

1. Field of the Invention

This invention relates to an elastomer to which special attention has recently been paid, and more particularly this invention relates to a novel lactone-modified diol which can be used as a soft segment component which provides a thermoplastic elastomer showing excellent performances in elastic recovery and low-temperature properties.

2. Description of the Prior Art

Conventionally known thermoplastic elastomers include those of polyesters, polyamides and segmented polyurethanes, and these elastomers generally contain polyalkylene ether diol, for example, polyethylene glycol, poly(1,2- or 1,3-propylene) glycol, polytetramethylene glycol, polyhexamethylene glycol, ethylene oxide/propylene oxide block or random copolymers and ethylene oxide/tetrahydrofuran block or random copolymers. Of these, polytetramethylene glycol is generally used from the viewpoint of, especially, heat resistance, water resistance, mechanical strength, elastic recovery and the like, but when use is made of a block copolymer having a so-called micro-phase separation structure, that is, a distinct micro-domain structure, formed by slightly lengthening a soft segment chain in order for the copolymer to exhibit the function as a soft segment fully, the properties such as low-temperature properties and elastic recovery are not necessarily satisfied in the present situation, because of the tendency of polytetramethylene glycol toward crystallization.

Concerning, for example, a segmented polyurethane elastomer, Japanese Patent Laid-Open No. 160016/1980 proposes a process comprising using a lactone-modified polyether diol prepared by adding polycaprolactone to polytetramethylene glycol as one for improving the heat resistance, mechanical properties, hydrolysis resistance, and low-temperature resistance of the copolymer. However, this process is not yet satisfactory in respect of, especially, elastic recovery.

SUMMARY OF THE INVENTION

As a result of ardent studies made to solve the above problem, the inventors of this invention have found that a saturated aliphatic lactone adduct of a specified polyalkylene ether diol having a methyl group side chain can form a soft segment component excellent in low-temperature properties and elastic recovery, and that it is also useful as an agent for improving the impact resistance and moldability of resins such as polyester resins, polycarbonate resins, polyvinyl chloride resins, and acrylonitrile/styrene resins, and have reached this invention.

Namely, it is an object of this invention to provide a saturated aliphatic lactone-modified diol of the general formula (II):

$$HO-Y.CO.O_p(A-O)_l(B-O)_m(CO.Y.O)_qH \quad (II)$$

wherein Y is a bivalent residue derived by removing the ester bond from a 6- to 8-carbon saturated aliphatic lactone ring, p and q are positive numbers determined by the amount of a saturated aliphatic lactone to be reacted, and $p+q \geq 1$, A represents

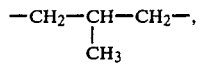

B represents $-CH_2-CH_2-CH_2-CH_2-$, and l and m are positive numbers satisfying the relationships: $l+m=$ about 6 to 140, and $l/m = 10/90$ to $100/0$ (molar ratio), obtained by reacting 1 mol of a polyalkylene ether diol of the general formula (I):

$$HO-A-O_l(B-O)_mH$$

wherein the repeating units are

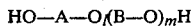

and $-CH_2-CH_2-CH_2CH_2-O-$, and A, B, l, and m are the same as defined in the general formula (II), with at least 1 mol of a 6- to 8-carbon saturated aliphatic lactone.

DETAILED DESCRIPTION OF THE PREFERRED EMBODIMENTS

First, the polyalkylene ether diol of the formula (I) may be readily prepared by the cationic ring-opening polymerization of 3-methyloxetane or the cationic ring-opening copolymerization of 3-methyloxetane with tetrahydrofuran. This is described in detail in Japanese Patent Application Nos. 8610/1982 and 8611/1982, and 3-methyloxetane or a 3-methyloxetane/tetrahydrofuran mixed system can be polymerized by ring opening by adding thereto a super-strong acid such as perchloric acid/acetic acid anhydride, perchloric acid/fuming sulfuric acid, or fluorosulfonic acid, and the desired polyalkylene ether diol can be obtained by saponification and after-treatments of the reaction product obtained. The polyalkylene ether diol thus produced is reacted with a saturated aliphatic lactone, and in this case, the polyalkylene ether diol may be a polyalkylene ether diol obtained from a homopolymer of 3-methyloxetane or may be a polyalkylene ether diol obtained from a copolymer of 3-methyloxetane with tetrahydrofuran, or further may be a mixture of these polyalkylene ether diols. Further, part of the polyalkylene ether diol may be replaced with polytetramethylene glycol. When a copolymer of 3-methyloxetane with tetrahydrofuran is used, the 2-methyltrimethylene units and the tetramethylene units may be arranged randomly or blockwise. The states of arrangement of these depend on the methods and conditions employed. However, it is necessary that the sum of l and m shown in the formula (I) is form about 6 to about 140, preferably from about 9 to about 100, and that the ratio l/m (molar ratio) is from 10/90 to 100/0. When the sum of l and m is smaller than about 6, the function of the lactone-modified diol prepared from this as soft segments becomes insufficient, whereas when this sum is greater than about 140, its increasing tendency toward phase separation makes the production of elastomers difficult when this is applied to a thermoplastic elastomer as a soft segment material. Further, although no problem will occur when the l/m ratio approaches 100/0, or the content of 3-methyloxetane homopolymer approaches 100 mol %, crystallinity due to the polyoxytetramethylene block is developed when the l/m ratio is below 10/90, or the 3-methyloxetane units account for below 10 mol % of the copolymer, which adversely affects the intended function. Further, for the same reason, the polyalkylene ether diol of this invention represented by the formula (I) must account for at least 10% by weight, preferably at least 20% by weight of the total polyether diol when part of these polyalkylene ether diols is replaced with other polyalkylene glycols such as polytetramethylene glycol.

Then, at least 1 mol of a 6- to 8-carbon saturated aliphatic lactone is added to 1 mol of the polyalkylene ether diol. Examples of the lactone include ε-caprolactone, ζ-enantolactone, and η-caprylolactone. This reaction is effected under agitation at 100 to 160° C., preferably 130 to 150° C. in an atmosphere of nitrogen. In order to accelerate the reaction, a catalyst is usually added. Examples of the catalysts which can be used include protonic acids such as sulfuric acid and phosphoric acid, Lewis acids such as aluminum chloride and stannous chloride, metallic sodium, and organotitanium compounds such as tetrabutyl titanate. By the above reaction, a soft segment material capable of providing excellent elastic recovery and low-temperature properties can be obtained. Further, a saturated aliphatic lactone-modified diol which serves as an agent for improving the impact resistance and moldability of resins such as polyester resins, polycarbonate resins, polyvinyl chloride resins, or acrylonitrile/styrene copolymer resins can be obtained. With regard to the number of moles of the saturated aliphatic lactone used per mole of the polyalkylene ether diol is within the applicable limit of this invention if it is greater than one mol, but in practice, it is determined according to the purpose of application of the saturated aliphatic lactone-modified diol. Namely, the preferable range is form 1 to 60 mol when it is used as a soft segment component for polyurethane, polyether, or the like, and it is preferably at least 30 mol % when it is used as an agent for improving the impact resistance and moldability.

This invention will now be described in detail with reference to examples.

Example 1

First, description will be made of the production of the polyalkylene ether diol being used in this invention.

100 ml of 3-methyloxetane was placed in a nitrogen-purged reaction vessel, to which 4.0 ml of acetic anhydride was added. The temperature of the reaction system was lowered to −70° C. with agitation. Then, 1.2 ml of 70% perchloric acid was added dropwise to this system over a period of about 5 minutes. Then, the temperature of the reaction vessel was raised slowly and brought to room temperature over two hours, and agitation was continued for further 40 hours. At this point, the reaction was terminated by the addition of 300 ml of deionized water and, after agitating the system at 80° to 90° C. for 2 hours, the aqueous layer was removed. The remaining organic layer was mixed with 100 ml of a ½ N alcoholic caustic potash solution and agitated at 80° C. for 2 hours. The mixture was distilled to remove the alcohol, and mixed with ether to form an etheric solution, which was filtered to remove solids. The filtrate was treated with activated clay and filtered again. The ether was distilled off from the filtrate to obtain 64 g of polyether of 3-methyloxetane. It had a hydroxyl value of 60.51, a number-average molecular weight as determined from the hydroxyl value of 1855, and a number-average molecular weight as determined by a vapor pressure osmometer of 1846.

Then, 50 g (0.027 mol) of this polyalkylene ether diol and 24.6 g (0.216 mol) of ε-caprolactone were placed in a four-necked separable flask fitted with an agitator, nitrogen gas inlet, nitrogen gas outlet, and thermometer. The reaction mixture was agitated at 140° C. for 1 hour while nitrogen gas was being passed slowly. After the addition of four drops of phosphoric acid as a catalyst, the reaction mixture was agitated at 140° C. for 16 hours. The reaction mixture turned to a slightly viscous, faintly yellow, transparent liquid. At this point, the reaction was terminated and the reaction mixture was cooled to room temperature to obtain 74 g of a white, soft, grease-like reaction product.

This reaction product had an acid value of 8.0 and a hydroxyl value of 47.2 (determined by the phthalic anhydridepyridine method). The number-average molecular weight as determined from the hydroxyl value based on the assumption that both the terminals of the reaction product were hydroxyl groups was 2378, and that as determined by a vapor pressure osmometer was 2375. Further, the amount of ε-caprolactone added as determined from the number-average molecular weight was 4.58 mol per mol of polyalkylene ether diol.

The infrared absorption spectrum of this ε-caprolactone-modified diol showed an absorption at 1100 cm$^{-1}$ assignable to an ether bond, an absorption at 1725 cm$^{-1}$ assignable to an ester bond, and an absorption at 3500 cm$^{-1}$ assignable to a hydroxyl group.

Further, its thermogram obtained by using a differential scanning colorimeter operated at a rate of temperature increase of 10° C./min showed a glass transition point of −68° C. due to the polyether block derived from 3-methyloxetane, and a melting point of 35° C. due to the polyester derived from ε-caprolactone.

Its proton NMR spectrum as measured at 100 MHz showed resonance peaks near 0.9 ppm due to the proton of a side chain methyl group of the polyether block, near 1.96 ppm due to a methine group proton, near 3.24 ppm due to the proton of a methylene group adjacent to an ether bond, and resonance peaks near 1.60 ppm due to the proton of a methylene chain of the polyester block, near 2.25 ppm due to the proton of a methylene group adjacent to the carbonyl of a carboxyl group, and near 4.00 ppm due to the proton of a methylene group adjacent to the oxygen of a carboxyl group.

Example 2

20 ml of 3-methyloxetane and 80 ml of tetrahydrofuran were placed in a nitrogen-purged reaction vessel, and the reaction system was cooled to −70° C. under agitation by using a dry ice-methanol freezing mixture. Then, 5.6 ml of fluorosulfonic acid was added dropwise to this system, over about 20 minutes with care not to raise the temperature of the reaction system to above −70° C. After completion of the addition, the temperature of the reaction system was raised slowly and brought to room temperature over about 10 hours and the reaction system was further agitated at this temperature for 30 hours. The reaction product turned to a viscous, deep yellow, transparent liquid. At this point, the reaction was terminated by the addition of 300 ml of deionized water and the reaction mixture was agitated at 80° to 90° C. for 2 hours to strip unreacted monomer and at the same time to hydrolyze the terminal groups. After separating the aqueous phase of the lower layer and further adding 300 ml of deionized water, the mixture was agitated at 80° to 90° C. for one hour, and the aqueous phase was removed again. 2 g of calcium hydroxide was added to and mixed and vibrated with the organic phase to neutralize remaining acid. After adding 50 ml of benzene, the mixture was heated to 80° to 90° C. to remove the water and benzene in the form of an azeotrope. The solid matter consisting mainly of calcium hydroxide was filtered off and the benzene was distilled off. The reaction product was a yellowish viscous liquid. In order to decolorize this reaction product, it was dissolved in acetone, active carbon was added to the solution to effect decolorization, the solution was filtered, and the acetone was distilled off from the filtrate to obtain 55 g (yield 62%) of a colorless, transparent, viscous liquid product. This product has an acid value of 3.4, a hydroxyl value of 77, a number-average molecular weight of 1465 (determined from the hydroxyl value based on the assumption that both of the terminals were hydroxyl groups) and a number-average molecular weight of 1475 (determined by a vapor pressure osmometer). Further, the NMR spectrum obtained from the measurement in a solution of the polymer in deuterated chloroform revealed that this polymer was a copolymer consisting of 26.0 mol % of 2-methyl-1,3-propanediol residues and 74.0 mol % of 1,4-butanediol residues.

Then, 33 g (0.0225 mol) of this copolyether diol was mixed with 31 g (0.2694 mol) of ε-caprolactone, and after adding one drop of tetrabutyl titanate as a catalyst, the mixture was agitated at 140° C. for 16 hours in an atmosphere of nitrogen in the same manner as in Example 1. When the reaction product was brought to room temperature, 64 g (yield 100%) of a slightly yellow, opaque, slightly hard, wax-like substance was obtained.

This reaction product had an acid value of 9.6, a hydroxyl value of 50.5 (measured by the phthalic anhydridepyridine method), and a number-average molecular weight of 2221 (measured from the hydroxyl value based on the assumption that both of the terminals of the reaction product were hydroxyl groups). On the other hand, the number-average molecular weight as determined by a vapor pressure osmometer was 2220, and both the values were in good agreement.

The amount of added ε-caprolactone as determined from the number-average molecular weight was 6.58 mol per mol of polyalkylene ether diol.

The infrared absorption spectrum of the obtained ε-caprolactone-modified diol showed an absorption near 1100 cm$^{-1}$ assignable to an ether bond, an absorption near 1200 cm$^{-1}$ assignable to a tetrahydrofuran unit and an abscrption near 1725 cm$^{-1}$ assignable to an ester bond. Its thermogram obtained by a differential scanning colorimeter showed a glass transition point at −63° C. due to the polyether block, and a melting point at 37° C. due to the polyester block derived from ε-caprolactone. The proton NMR spectrum as measured at 100 MHz showed resonance absorption peaks due to the protons in the same positions as those in Example 1, but the absorption near 1.60 ppm due to the proton of a methylene chain of the polyester block and the one near 1.60 ppm due to the proton of a methylene chain contained in the tetrahydrofuran unit of the polyether block coincided and therefore the peak was intensified.

Example 3

40 ml of 3-methyloxetane and 60 ml of tetrahydrofuran were placed in a reaction vessel in the same way as in Example 1. Then 1.2 ml of acetic anhydride and 1.2 ml of 70% perchloric acid were added at −70° C., and the mixture was brought slowly to room temperature to continue the reaction at this temperature for 300 hours. In the same way as in Example 2, the reaction was terminated by the addition of deionized water, and the reaction product was saponified and purified to obtain 49.8 g of colorless, transparent, viscous reaction product. The copolymer composition as determined from the NMR spectrum showed that it was a copolyether diol consisting of 71.5 mol % of 2-methyl-1,3-propanediol residues and 28.5 mol % of 1,4-butanediol residues, and it had a hydroxyl value of 111.8, an acid value of 3.5, a number-average molecular weight of 1003 (determined from the hydroxyl value), and a number-average molecular weight of 1010 (determined with a vapor pressure osmometer).

Then, 21 g (0.020 mol) of this copolyether diol was mixed with 45.7 g (0.400 mol) of ε-caprolactone and, after adding four drops of phosphoric acid as a catalyst, the mixture was reacted at 145° C. for 15 hours in an atmosphere of nitrogen in the same way as in Example 1. The reaction product 66.0 g (yield 99.9%) was a light yellow-white, opaque, hard wax-like polymer and had an acid value of 15.0, a hydroxyl value of 41.3, a number-average molecular weight of 2716 (determined from the hydroxyl value), and a number-average molecular weight of 2710 (determined with a vapor pressure osmometer). The reaction product had 14.58 mol of added ε-caprolactone per mol of copolyether diol.

Example 4

232 g (2.035 mol) of ε-caprolactone was added to 20 g (0.010 mol) of a polyalkylene ether diol obtained from 3-methyloxetane as in Example 1 and having a number-average molecular weight of 1966 (determined from the measurement of a hydroxyl value, hydroxyl value: 57.1), and, after adding 10 ppm, based on ε-caprolactone, of tetrabutyl titanate as a catalyst, the mixture was reacted at 140° C. for 20 hours in an atmosphere of nitrogen. The reaction product was a slightly yellow-white, opaque, hard polymer. This polymer was broken, and the unreacted ε-caprolactone and oligomer were removed by extraction with hot methanol to obtain about 240 g of a product. This product had an acid value of 1.1, a hydroxyl value of 4.6, a number-average molecular weight of 24300 (determined from the hydroxyl value), and an amount of added ε-caprolactone of about 196 mol per mol of the polyalkylene ether diol. A 1 mm thick sheet was obtained by press-molding the ε-caprolactone-modified diol. The strength and elongation of this sheet were measured by the dumb-bell test according to JIS at a punching cross-head speed of 50 mm/min. The breaking strength was 190 kgf/cm, and the elongation at break was 980%.

The melting temperature obtained by using a differential scanning colorimeter operated at a rate of temperature increase of 20° C./min was 59° C., and the glass transition point was −61° C.

The embodiments of the invention in which an exclusive property or privilege is claimed are defined as follows:

1. A saturated aliphatic lactone-modified diol of the formula (II)

HO—Y.CO.O$_p$(A—O)$_r$(B—O)$_m$(CO.Y.O)$_q$H     (II)

wherein Y is a bivalent residue derived by removing the ester bond from a 6- to 8-carbon saturated aliphatic lactone ring, p and q are positive numbers depending on the mole number of a saturated aliphatic lactone reacted, $p+q \geq 1$, A is $$-CH_2-CH-CH_2-,$$
$$\quad\quad\quad |$$
$$\quad\quad\quad CH_3$$

B is $-CH_2-CH_2-CH_2-CH_2-$, and l and m are each positive numbers satisfying the relationships: $l+m$ = about 6 to 140 and $l/m$ = 10/90 to 100/0 (molar ratio).

2. A saturated aliphatic lactone-modified diol as claimed in claim 1, which has been obtained by reacting 1 mol of a polyalkylene ether diol of the formula (I):

$$HO-A-O_l(B-O)_mH \quad\quad\quad (I)$$

wherein A, B, l, and m are defined in same way as in the formula (II), with at least 1 mol of a 6- to 8-carbon saturated aliphatic lactone.

3. A saturated aliphatic lactone-modified diol as claimed in claim 1, in which the alkylene ether units —A-O) and —B-O) are arranged randomly or blockwise in the molecule.

4. A saturated aliphatic lactone-modified diol as claimed in claim 1, in which the sum of p and q in the formula (II) ranges from 1 to 60.

5. A saturated aliphatic lactone-modified diol as claimed in claim 2, in which the sum of p and q in the formula (II) ranges from 1 to 60.

6. A saturated aliphatic lactone-modified diol as claimed in claim 1, in which the sum of p and q in the formula (II) ranges from 30 to 60.

7. A saturated aliphatic lactone-modified diol as claimed in claim 2, in which the sum of p and q in the formula (II) ranges from 30 to 60.

8. A process for manufacturing a saturated aliphatic lactone-modified diol of the formula (II)

$$HO-Y.CO.O_p(A-O)_l(B-O)_m(CO.Y.O)_qH \quad\quad\quad (II)$$

wherein Y is a bivalent residue derived by removing the ester bond from a 6- to 8-carbon saturated aliphatic lactone ring, p and q are positive numbers depending on the mole number of a saturated aliphatic lactone reacted, $p+q \geq 1$, A is $$-CH_2-CH-CH_2-,$$
$$\quad\quad\quad |$$
$$\quad\quad\quad CH_3$$

B is $-CH_2-CH_2-CH_2-CH_2-$, and l and m are each positive numbers satisfying the relationships: $l+m$ = about 6 to 140 and $l/m$ = 10/90 to 100/0 (molar ratio), which comprises the steps of reacting 1 mol of a polyalkylene ether diol of the formula (I):

$$HO-A-O_l(B-O)_mH \quad\quad\quad (I)$$

wherein A, B, l, and m are defined in the same way as in the formula (II), with at least 1 mol of a 6- to 8-carbon saturated aliphatic lactone, and recovering the resulting diol.

* * * * *

UNITED STATES PATENT AND TRADEMARK OFFICE
CERTIFICATE OF CORRECTION

PATENT NO. : 4 539 394
DATED : September 3, 1985
INVENTOR(S) : Yutaka Fukuda et al It is certified that error appears in the above-identified patent and that said Letters Patent is hereby corrected as shown below:

Column 6, line 65; change the formula to read as follows:

$$---HO\hspace{-2pt}-\hspace{-2pt}(Y.CO.O)_p\hspace{-4pt}-\hspace{-4pt}(A-O)_\ell\hspace{-4pt}-\hspace{-4pt}(B-O)_m\hspace{-4pt}-\hspace{-4pt}(CO.Y.O)_q\hspace{-2pt}-H \quad (II)---.$$

Column 7, line 17; change the formula to read as follows:

$$---HO\hspace{-4pt}-\hspace{-4pt}(A-O)_\ell\hspace{-4pt}-\hspace{-4pt}(B-O)_m\hspace{-4pt}-H \quad (I)---.$$

Column 8, line 10; change the formula to read as follows:

$$---HO\hspace{-2pt}-\hspace{-2pt}(Y.CO.O)_p\hspace{-4pt}-\hspace{-4pt}(A-O)_\ell\hspace{-4pt}-\hspace{-4pt}(B-O)_m\hspace{-4pt}-\hspace{-4pt}(CO.Y.O)_q\hspace{-2pt}-H \quad (II)---.$$

Signed and Sealed this

Eleventh Day of March 1986

[SEAL]

Attest:

DONALD J. QUIGG

Attesting Officer

Commissioner of Patents and Trademarks